United States Patent [19]

Turk et al.

[11] Patent Number: 4,615,714
[45] Date of Patent: Oct. 7, 1986

[54] REMOVAL OF HYDROGEN SULFIDE FROM AIR STREAMS

[76] Inventors: Amos Turk, 7 Tarrywile Lake Dr., Danbury, Conn. 06810; J. Michael Brassey, 27 W. 89 St., New York, N.Y. 10024

[21] Appl. No.: 819,027

[22] Filed: Jan. 15, 1986

Related U.S. Application Data

[63] Continuation-in-part of Ser. No. 643,038, Aug. 22, 1984, abandoned.

[51] Int. Cl.[4] ............................................. B01D 53/04
[52] U.S. Cl. .......................................... 55/73; 55/74; 423/230
[58] Field of Search ............................... 55/70, 73, 74; 423/210 S, 220, 230

[56] References Cited

U.S. PATENT DOCUMENTS 4,072,479 2/1978 Sinha et al. .............................. 55/73
4,212,852 7/1980 Aibe et al. ........................... 423/230

Primary Examiner—Charles Hart
Attorney, Agent, or Firm—Leon E. Tenenbaum

[57] ABSTRACT

In a process for removing hydrogen sulfide from an oxygen-containing gas stream by passing said gas stream through activated carbon, said stream containing from about 5 ppm to about 10,000 ppm by volume, which comprises adding ammonia to said stream prior to its passage through the carbon, improvement in which the amount of added ammonia is such that its concentration will be at least equal to the concentration of the hydrogen sulfide and not greater than 10,000 ppm with the proviso that when the concentration of hydrogen sulfide exceeds 4,000 ppm by volume, the concentration of the ammonia will not be greater than 6,000 ppm by volume.

4 Claims, No Drawings

REMOVAL OF HYDROGEN SULFIDE FROM AIR STREAMS

This application is a continuation-in-part application of patent application Ser. No. 06/643,038, filed Aug. 22, 1984 and now abandoned.

This invention relates to the removal of hydrogen sulfide and other gases from an air stream that is discharged into an ambient atmosphere. It particularly relates to an improved process for the removal of hydrogen sulfide from air prior to its discharge into the atmosphere.

BACKGROUND OF THE INVENTION

Hydrogen sulfide has long been known to be objectionably odorous even in very low concentrations in air, as well as extremely toxic. Its odor is objectionable to most people in concentrations as low as a few parts per million by volume, and is detectable and even recognizable in concentrations as low as a few parts per billion. G. Leonardos, J. Air Pollution Control Association, Vol. 19, p. 91 (1969), has reported the odor threshold for hydrogen sulfide to be 0.47 parts per billion by volume in air. Furthermore, hydrogen sulfide is produced by many natural as well as industrial processes or operations. For example, the bacterial decomposition of sulfur-containing organic matter produces hydrogen sulfide, and therefore this gas is present in sewage, garbage dumps, sulfur springs, and rotting vegetation that is rich in sulfur, such as cabbages, broccoli, and brussels sprouts. In addition, the production of pulp and paper, the purification of waste water, and the storage and transfer of petroleum products release hydrogen sulfide into the ambient atmosphere. For these reasons considerable effort has been made toward developing improved methods for the removal of hydrogen sulfide from air. U.S. Pat. No. 4,072,479 describes the use of a bed of activated carbon treated with sodium hydroxide and moisture for removing hydrogen sulfide and other sulfur compounds. The saturated or exhausted carbon can be regenerated by treatment with dilute sodium hydroxide solution.

Some disclosures have been made regarding the use of ammonia gas as an aid to the removal of hydrogen sulfide from air. U.S. Pat. No. 2,168,933 teaches that hydrogen sulfide can be removed from technical gases such as water gas by the use of activated carbon with the addition of small amounts of air and ammonia. British Pat. No. 337,348 also discloses the use of ammonia, but this is for the reactivation of carbon, not for its use as an adsorbent. Engelhardt (Zeitschrift fur angewandte Chemie, Vol. 34, pp. 293–296, (1921)), describes the addition of ammonia to a gas stream containing hydrogen sulfide and oxygen for recovery of the sulfur. The same process is referred to in U.S. Pat. No. 4,072,479.

In our studies of the removal of hydrogen sulfide from air containing the same, we have confirmed that the addition of ammonia serves to enhance the removal of the hydrogen sulfide from air when an air stream containing both the hydrogen sulfide and ammonia is passed through activated carbon. However, the introduction of ammonia into the hydrogen sulfide-containing air stream frequently resulted in the formation of and in the deposition of solid ammonium polysulfide in the equipment through which the air stream is passed. The build-up of these deposits eventually required the dismantling of the equipment to remove these deposits since they diminished the rate of flow of the air stream to the activated carbon thus slowing the rate of the process. Such dismantling operations are time consuming and costly.

THE PRESENT INVENTION

It is, accordingly, an object of this invention to provide an improved process for removing hydrogen sulfide present in gas streams containing oxygen, such as air streams, by passing the said stream through activated carbon.

It is another object of this invention to provide such an improved process involving the addition of ammonia to said stream.

It is a further object of this invention to provide an improved process involving the addition of ammonia to the hydrogen sulfide containing-air stream in which process little or no ammonium polysulfide is deposited in the equipment through which the air stream containing both hydrogen sulfide and ammonia passes.

Other objects will appear in the description which follows.

This invention provides an improved process for the removal of hydrogen sulfide present in oxygen-containing gas streams, such as air, which involves introducing ammonia into the hydrogen sulfide-containing air stream and then passing the stream through activated carbon. We have now found that in order to obtain the maximum effect from the ammonia in removing the hydrogen sulfide from the air stream and to prevent the formation of ammonium polysulfide and its deposition in the equipment, it is necessary that the concentrations of the hydrogen sulfide and the ammonia in the air stream must fall within certain limits.

In accordance with this invention, there is provided an improvement in the process for removing hydrogen sulfide present in an oxygen-containing gas stream, e.g. air, when ammonia is introduced into said gas stream prior to its passage through activated carbon and then its release into the atmosphere, said stream containing from about 5 ppm by volume to about 10,000 ppm by volume of hydrogen sulfide, which improvement comprises: (i) determining the concentration of the hydrogen sulfide in the gas stream, and (ii) adding ammonia to the stream, the amount of added ammonia being such that the concentration of the ammonia will be at least equal to the concentration of the hydrogen sulfide and not greater than 10,000 ppm by volume, with the proviso that when the concentration of the hydrogen sulfide exceeds 4,000 ppm by volume, the concentration of the ammonia will not be greater than 6,000 ppm by volume.

Under these conditions substantially all of the hydrogen sulfide is removed while the activated carbon remains active, and no ammonium polysulfide is deposited in the equipment.

The invention will become clearer from the examples which follow. These examples are given for illustration only, and are not to be considered as limiting.

Examples 1 and 2 illustrate the improvement achieved in the removal of hydrogen sulfide when ammonia is introduced into the gas stream containing hydrogen sulfide prior to said stream being passed through a bed of activated carbon.

EXAMPLE 1

In a laboratory test, a humidified air stream containing 10,000 ppm by volume of hydrogen sulfide was introduced into a cylindrical column of granular activated carbon that was 1 inch in diameter and 6 inches in the direction of air flow, at a volumetric rate of 1150 mL/min. The effluent stream was odorless at first, then became faintly odorous of hydrogen sulfide within 10 to 15 minutes, and intolerably odorous within 20 to 30 minutes.

EXAMPLE 2

The conditions of Example 1 were repeated with the modification that 15,000 ppm by volume of ammonia gas was introduced into the air stream along with the 10,000 ppm of hydrogen sulfide prior to the column of activated carbon. The effluent air stream, inodorous at first, soon had a strong odor of ammonia, but no odor of hydrogen sulfide. Chemical tests for hydrogen sulfide were negative. This condition persisted for 20 hours, after which the effluent air stream behaved as it did in Example 1, first becoming faintly odorous of hydrogen sulfide, and then intolerably odorous within about 20 minutes of the first detection of this gas. After the experiment the equipment was dismantled and a deposit of ammonium polysulfide was present in the duct through which the air containing both the hydrogen sulfide and the ammonia had passed.

Following the procedure described in Example 2 experiments were conducted with air samples containing varying concentrations of hydrogen sulfide and ammonia. The results showing the concentrations of the hydrogen sulfide and ammonia and the degree of deposition of ammonium polysulfide, are given in Table 1 below. In all experiments the effluent air behaved as described in Example 2 in respect of the hydrogen sulfide detectable therein. In the table, the concentrations are given in ppm by volume.

TABLE 1

| Example No. | Concentration of Hydrogen Sulfide | Concentration of Ammonia | Deposition of Ammonium Polysulfide |
|---|---|---|---|
| 3 | 9,000 | 17,000 | +++ |
| 4 | 4,000 | 17,000 | +++ |
| 5 | 2,000 | 17,000 | ++ |
| 6 | 1,600 | 17,000 | ++ |
| 7 | 9,000 | 10,500 | +++ |
| 8 | 4,000 | 10,500 | ++ |
| 9 | 2,000 | 10,500 | − |
| 10 | 1,600 | 10,500 | − |
| 11 | 9,000 | 6,500 | ++ |
| 12 | 4,000 | 6,500 | + |
| 13 | 2,000 | 6,500 | − |
| 14 | 1,600 | 6,500 | − |
| 15 | 9,000 | 6,000 | + |
| 16 | 4,000 | 6,000 | − |
| 17 | 2,000 | 6,000 | − |
| 18 | 1,600 | 6,000 | − |
| 19 | 9,000 | 4,000 | − |
| 20 | 4,000 | 4,000 | − |
| 21 | 2,000 | 4,000 | − |
| 22 | 1,600 | 4,000 | − |
| 23 | 2,000 | 2,000 | − |
| 24 | 1,500 | 2,000 | − |
| 25 | 500 | 1,000 | − |
| 26 | 500 | 500 | − |
| 27 | 100 | 1,000 | − |
| 28 | 100 | 500 | − |
| 29 | 50 | 100 | − |
| 30 | 50 | 50 | − |
| 31 | 15 | 50 | − |
| 32 | 5 | 5 | − |

+++ Definite deposit
++ Slight deposit
+ Very slight deposit
− No deposit

While we have shown that the proper control of the concentration of ammonia added to a hydrogen sulfide-containing air stream will enhance the removal of hydrogen sulfide from such stream without the concurrent deposition of ammonium polysulfide in the equipment, the use of ammonia in large scale operations creates another problem in that the ammonia is released into the ambient atmosphere creating an odor nuisance.

The dispersal of gases in the atmosphere is a well recognized specialty in the science of meteorology. (See, for example, *Atmospheric Diffusion*, by F. Pasquill, D. Van Nostrand Co., London, 1962). Mathematical formulas for calculating the expected concentrations of pollutants at various distances from a given source have been theoretically derived and experimentally verified. One such widely used formula is that known as the Bosanquet and Pearson equation (C. H. Bosanquet and J. L. Pearson, "The Spread of Smoke and Gases from Chimneys," Trans. Faraday Soc., Vol. 32, p. 1249,1936), which is:

$$C_{O,max} = 0.216 Q(p/q)/uH^2 \qquad (I)$$

where the terms have the following meanings:

$C_{O,max}$ is the maximum concentration of pollutant reached at ground level, expressed as a fraction of the concentration of the pollutant at the source (in the stack), such as $C_{O,max} = C_{ground}/C_{stack}$;

Q is emission rate from stack in cubic feet/minute, (cfm);

p and q are diffusion coefficients related to atmospheric turbulence;

u is wind velocity in ft/min; and h is height of stack above ground level in ft.

The ratio (p/q) is a turbulence parameter which is determined as follows:

|  | P | q | (p/q) |
|---|---|---|---|
| For low turbulence | 0.02 | 0.04 | 0.50 |
| For average turbulence | 0.05 | 0.08 | 0.63 |
| For moderate turbulence | 0.10 | 0.16 | 0.63 |

The distance, $x_{max}$, at which the maximum ground level concentration is reached is given by:

$$x_{max} = H/2p$$

The odor threshold concentration of ammonia has been cited in one report as 5 parts per million by volume, or ppm (F. A. Patty, Industrial Hygiene and Toxicology, Interscience Publishers, Inc., New York, 1949), and in another as 47 ppm (G. Leonardos, J. Air Pollution Control Association, Vol. 19, p. 91, 1969). The magnitude of the difference between the two values is not unusual in the literature of odor threshold values, and may well be the result of differences in the sensitivities of the judges used in the two studies.

We have found that an effective system for the control of hydrogen sulfide odor using ammonia in conjunction with activated carbon requires the admixture of ammonia into the oxygen-containing gas stream containing hydrogen sulfide in a concentration not less than that of the concentration of the hydrogen sulfide in said stream and not greater than that which would be reduced below the threshold of odor detection of ammonia by its dispersal in air to the point of maximum concentration at ground level.

Alternatively, the input concentration of ammonia can be established by the requirement that the effluent concentration of ammonia at the stack be high enough to be detectable by odor, but still not be greater than that which would be reduced below the odor threshold by its dispersal in air to the point of maximum ground level concentration. The maximum concentration of the ammonia which may be present is the value $C_{O,max}$ which can be readily calculated from formula (I) above.

The application of these principles is shown in Examples 33 to 36.

EXAMPLE 33

An air stream of 2,500 cfm from a processing area in a sewage treatment plant, containing 60 ppm by volume of hydrogen sulfide was passed through a cylindrical bed of 640 lb of granular activated carbon that was one foot deep in the direction of air flow. The bed density was 27 lb per cu ft. The effluent air stream was discharged from a vent that was 12 feet above ground level. Ammonia gas at a concentration of 200 ppm was introduced into the gas stream prior to the carbon. The outdoor air was very calm, with a wind velocity of about 1 mile per hour (88 ft/min). Under these conditions, $p/q = 0.50$ and $$C_{0,max} = \frac{0.216 \times 2500 \times 0.50}{88 \times 12^2}$$

$$= 0.021$$

The anticipated maximum ground level concentration of ammonia is $$C_{ground} = C_{0,max} \times C_{stack}$$
$$= 0.021 \times 200 \text{ ppm} = 4.2 \text{ ppm}$$

In the absence of any control system, the maximum ground level concentration of hydrogen sulfide would be $0.021 \times 60$ ppm = 1.26 ppm, which is far above the odor threshold and would be objectionably odorous to most people.

The distance at which this maximum ground level concentration would be expected to occur, $x_{max}$ is $$x_{max} = H/2p = 12 \text{ ft}/(2 \times 0.02) = 300 \text{ ft.}$$

Seven odor judges, each previously screened and found to have normal responses and sensitivities to odor, were used to obtain the following results:

Gas samples taken at the stack in plastic bags and presented to the judges had no preceptible odor of hydrogen sulfide, but the odor of ammonia was readily detectable by all the judges.

The seven judges were then positioned at different locations at ground level downwind from the stack. The average wind direction was from the east (90°). One judge was positioned 200 ft from the stack at 90°; three judges were positioned 300 ft from the stack, one at 75°, one at 90°, and one at 105°. The last three judges were positioned 350 feet from the stack, one at 60°, one at 90°, and one at 120°. These locations were chosen to take into account the fact that the actual or "instantaneous" location of the effluent from a stack (knows as the "plume") varies, typically from 10 to 30 degrees to each side of the average plume. The instantaneous plume also varies in height above ground level, so that the distance to the point of maximum ground level concentration is also an average value. It is therefore important to make sensory odor judgments at various locations closer to and farther than the calculated point of maximum ground level as well as at either side of this point. The seven judges remained at their designated locations for one and one-half hours, and none of them detected any odor of ammonia at any time.

EXAMPLE 34

The operation of Example 33 was repeated under the same outdoor air conditions, with the same concentration of hydrogen sulfide, and the same locations of the seven odor judges, but with the concentration of ammonia introduced into the gas stream increased to 1000 ppm. Under these conditions the anticipated maximum ground level concentration of ammonia is $$C_{ground} = 0.021 \times 1000 \text{ ppm} = 21 \text{ ppm}$$

During the one and one-half hour test, the judges located at 200 ft and 75°, at 300 ft and 75°, at 300 ft and 90°, and at 350 ft and 90° smelled ammonia odor from time to time. Evidently, the concentration of ammonia introduced into the gas stream was too high to be effectively diluted under the conditions of the test.

EXAMPLE 35

A gas stream of 30,000 cfm from a processing area associated with pulp and paper manufacture contained 600 ppm of hydrogen sulfide, and was divided into 12 equivalent gas streams of 2500 cfm each. Each such gas stream was then passed through a cylindrical bed of 640 lb of granular activated carbon that was one foot deep in the direction of air flow. The 12 separate gas streams were then recombined by a manifold into a single stream which was discharged through a stack of 40 ft above ground level. Ammonia gas at a concentration of 1000 ppm was introduced into the 30,000 cfm gas stream prior to its splitting into the 12 carbon beds. There was a moderate breeze with an average wind velocity of 15 miles/hr, or 1320 ft/min, from the southwest (225°), with average air turbulence. Under these conditions, $$C_{0,max} = \frac{0.216 \times 30,000 \times 0.63}{1320 \times 40^2}$$

$$= 0.0019$$

The anticipated maximum ground level concentration of ammonia was $$C_{ground} = 0.0019 \times 1000 \text{ ppm} = 1.9 \text{ ppm.}$$

In the absence of any control system, the maximum ground level concentration of hydrogen sulfide would be $0.0019 \times 600$ ppm = 1.14 ppm, which is far above the odor threshold and would be objectionably odorous to most people.

The distance at which this maximum ground level concentration would be expected to occur, $x_{max}$ is $$x_{max} = H/2p = 40 \text{ ft}/(2 \times 0.05) = 400 \text{ ft}$$

Gas samples taken at the stack in plastic bags and presented to the judges had no perceptible odor of hydrogen sulfide, but the odor of ammonia was strong.

Five odor judges were used, one at 300 ft and 225°, one at 400 ft and 205°, one at 400 ft and 225°, one at 400 ft and 245°, and one at 500 ft and 225°. All the judges remained at their stations for 75 minutes, and no odor of ammonia was detected at any time.

EXAMPLE 36

The entire effluent produced under the same conditions as described in Example 35, after having passed through the carbon beds and being recombined into a single stream, was diverted from the stack and released directly to the atmosphere from a duct positioned at 15 ft above ground level. The atmospheric conditions were the same as those described in Example 3. Then, $$C_{0,max} = \frac{0.216 \times 30,000 \times 0.63}{1320 \times 15^2}$$

$$= 0.014$$

The anticipated maximum ground level concentration of ammonia was $$C_{ground} = 0.014 \times 1000 \text{ ppm} = 14 \text{ ppm}.$$

The odor judges were positioned at the same locations as described in Example 33. During the test all the odor judges at 400 ft and the judge at 300 ft and 205° experienced ammonia odor from time to time. Here again, the concentration of ammonia introduced into the gas stream was too high to be effectively diluted under the conditions of the test.

We claim:

1. In a process for removing hydrogen sulfide present in an oxygen-containing gas, which comprises introducing ammonia into the gas, passing the gas through activated carbon, and releasing the gas through a stack into the atmosphere, said gas containing from about 5 ppm by volume to about 10,000 ppm by volume of hydrogen sulfide, the improvement which comprises: (i) determining the concentration of hydrogen sulfide in the gas, and (ii) adding the ammonia in an amount so that the concentration of the ammonia will be at least equal to the concentration of the hydrogen sulfide and not greater than 10,000 ppm by volume, with the proviso that when the concentration of hydrogen sulfide exceeds 4,000 ppm by volume, the concentration of the ammonia will not be greater than 6,000 ppm by volume.

2. A process according to claim 1 therein the oxygen-containing stream is air.

3. A process according to claim 2 wherein the concentration of the hydrogen sulfide is from about 1,600 to about 4,000 ppm by volume and the concentration of the ammonia is about 6,000 ppm by volume.

4. A process according to claim 2 wherein the concentration of the hydrogen sulfide is from about 1,600 to about 9,000 ppm by volume and the concentration of the ammonia is about 4,000 ppm by volume.

* * * * *